Patented Nov. 26, 1940

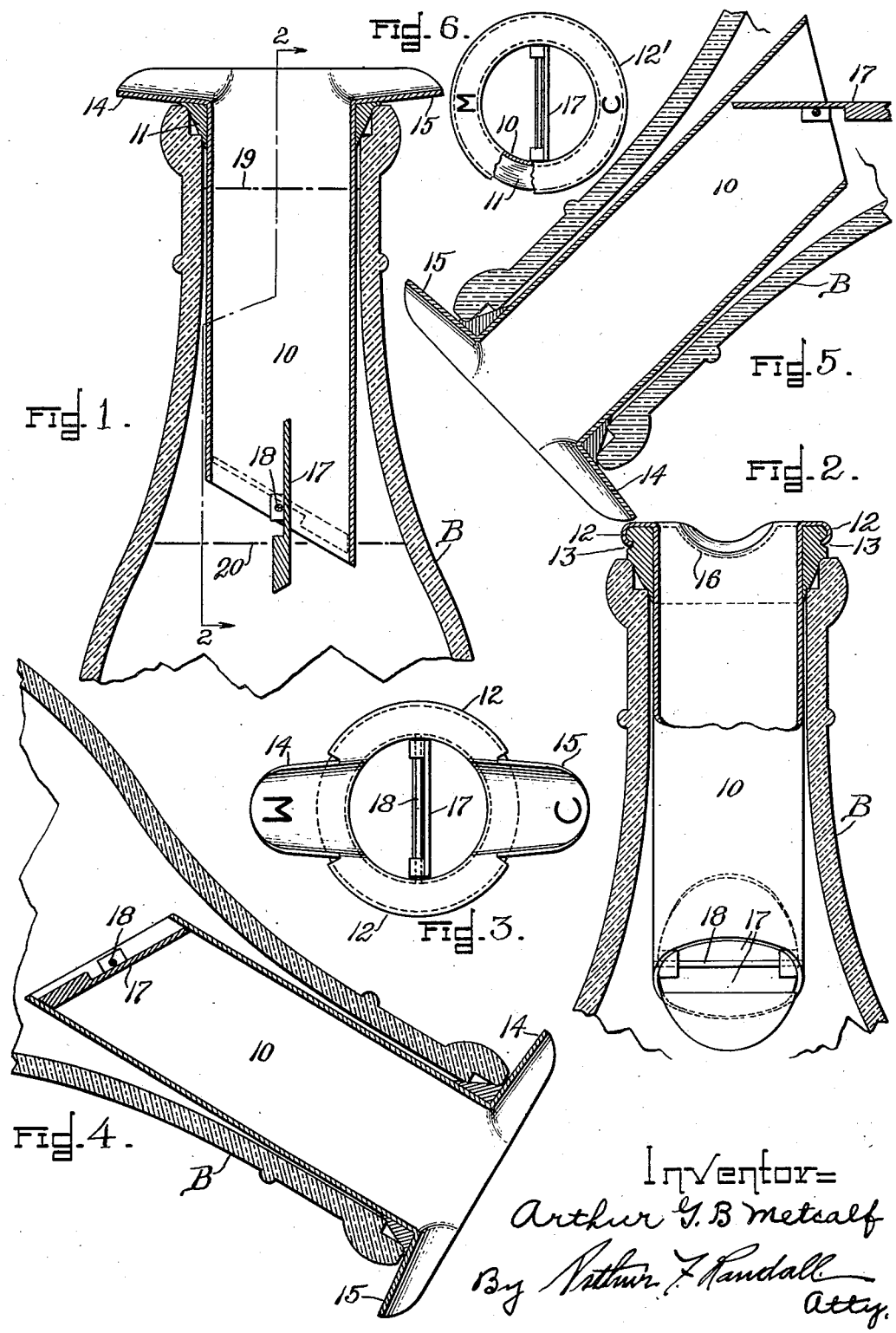

2,222,594

UNITED STATES PATENT OFFICE 2,222,594

POURING ATTACHMENT FOR CONTAINERS

Arthur G. B. Metcalf, Milton, Mass., assignor to Parshad Holding Corporation, Syracuse, N. Y., a corporation of New York Application June 2, 1938, Serial No. 211,314

5 Claims. (Cl. 210—51.5)

This invention relates to a pouring attachment for application to milk bottles and the like.

The object of the invention is to provide a pouring attachment for existing bottles and like containers such as are commonly used in dispensing milk, which attachment will enable the cream that rises to the top of the contents thereof and the milk which settles at the bottom, to be separately poured out of the bottle or other container without intermixture of the two. It is also an object of this invention to provide a device of this character which will be of simple, efficient and inexpensive construction.

To these ends I have provided a pouring attachment of the character indicated which may be constructed and operate as set forth in the following description, the several novel features of the invention being separately pointed out and defined in the claims at the close thereof.

In the accompanying drawing:

Figure 1 is a central vertical sectional view of the upper portion of a milk bottle having my new pouring attachment applied thereto.

Figure 2 is a section on line 2—2 of Fig. 1.

Figure 3 is a top plan view of the attachment.

Figure 4 illustrates the position into which the bottle is adjusted to pour off the cream to the exclusion of the milk.

Figure 5 illustrates the position into which the bottle is adjusted to pour off the milk after delivery of the cream.

Figure 6 illustrates, on reduced scale, an alternative construction.

The embodiment of my invention herein illustrated comprises a tubular body 10 adapted to be inserted within the upper portion or neck of a milk bottle or the like as shown in the drawing and adjacent to its upper end this tubular body has mounted upon the outside thereof an exteriorly conical closure annulus or collar 11 which is preferably made from soft rubber and which is wedged or forced into the mouth of the bottle to close the same and which also serves to frictionally hold the tubular body 10 in position within the bottle B.

The closure collar 11 may be secured to the body 10 by means of radially and downwardly extending flange segments 12, Figs. 2 and 3, provided at opposite sides of the top of body 10 and occupying channels or grooves 13 provided upon opposite sides of the collar.

The top of body 10 is also preferably made with two radial spouts 14 and 15 disposed diametrically opposite each other, and these spouts occupy recesses provided in the top of the collar 11, one of said recesses being indicated by dotted lines at 16 in Fig. 2.

Within the lower end of tubular body 10 is arranged a butterfly valve 17 pivotally supported therein by a diametrically disposed pintle 18. This valve is designed so as to close against a seat on body 10 as shown in Fig. 4 when the bottle is tilted in one direction at an angle from the vertical, but so as to be held open through engagement with the tubular body 10, as shown in Fig. 5, when the bottle is tilted in the opposite direction from the vertical. The valve 17 may seat obliquely within body 10 as shown to occasion the closing of the valve at the desired angle of tilt of the bottle and as illustrated this angle is about sixty degrees.

In the illustrated embodiment of the invention the center of gravity of valve 17 is offset with respect to the axis of pintle 18 which causes gravitational force exerted on the same side of the pivot as the center of weight, to close the valve when the container is tilted in one direction. In this way the closing moment is generated both by static (weight) forces in conjunction with hydrodynamic pressural forces, both of which are set up upon tilting the bottle. Once the valve is closed it is maintained closed by a balance of pressures and in this connection it is important to note that this balance of pressure makes it unnecessary for the valve to fit perfectly within the tube, a very important fact from the standpoint of cost of production. However, this makes it necessary to provide a sealing washer or collar 11 on the outside of the tube to close the joint between the bottle neck and the outside of tubular body 10 and this closure effect is accomplished by merely inserting the attachment in the neck of the bottle.

The angle of tilt of the device at which the valve closes and the transient state ends and pressure equilibrium begins is determined by the angle of the valve relatively to the axis of the body 10 when the valve seats. In the illustrated embodiment this angle of tilt is chosen to correspond with the natural angle at which the bottle would be held when starting to pour the cream whose level is ordinarily at about the broken line 19 in Fig. 1.

It is important to note that the radial pouring spout 15 which is used when delivering the cream from the bottle is orientated with respect to the axis of valve 17 in such manner that when pouring out the cream through this spout the axis of valve pivot 18 is at right angles, or approximately so, to said spout and to the gravitational field of the valve. When the device is first inserted within the bottle with the level of the cream in the neighborhood of the broken line 19, Fig. 1, of course the tubular body 10 is filled up with cream as far as said line. Thus when the bottle is tilted far enough toward spout 15 the contents of said tubular body may be completely discharged by gravity while the milk, whose level is indicated in Fig. 1 by the broken line 20, remains trapped within the tilted bottle because of the closures at valve 17 and collar 11.

After removal of all of the cream the bottle may be tilted in the opposite direction toward spout 14 with the result that the valve 17 is swung into its open position shown in Fig. 5 thus permitting the milk to be delivered from the bottle.

The alternative construction illustrated in Fig. 6 is the same as that illustrated in the other figures of the drawing with the exception that the spouts 14 and 15 of the latter are dispensed with and the upper end of the tubular body 10 is made with a single circular flange 12' for holding the rubber collar 11 in position, the top side of said flange bearing direction indicatng devices consisting of the two letters M and C disposed diametrically opposite each other and orientated with respect to valve 17 so that when the bottle is tilted toward C the cream will be delivered and when tilted toward M the milk will be delivered.

It will be clear that any other suitable type of valve may be substituted for that herein shown so long as the cream has access to the interior of body 10 when the bottle occupies an upright position; so long as it will automatically close and prevent discharge of the milk when the bottle is tilted from a perpendicular position in one direction to deliver the cream from body 10 and so long as it permits outflow of the milk when the bottle is tilted in the opposite direction.

What I claim is:

1. An attachment of the character described comprising a tubular body for insertion within the upper portion of a container; means adjacent to the upper end of said body for supporting the latter within the container and for sealing the joint between said body and the container, and a normally open valve pivotally mounted on said tubular body adjacent to the lower end of the latter to swing on an axis at right angles to the axis of said tubular body and with its center of gravity off-set relatively to its pivot so that said valve is closed by gravity against a seat on said tubular body when the container is tilted sidewise in one direction at right angles to said first-mentioned axis thereby to deliver the contents of said tubular body to the exclusion of the contents of the lower portion of the container.

2. An attachment of the character described constructed in accordance with claim 1 and wherein said means for supporting the tubular body within the container and for sealing the joint between the body and container consists of an exteriorly conical annulus surrounding the upper portion of said body and adapted to be wedged into the top of the container.

3. An attachment of the character described comprising a tubular body for insertion within the upper portion of a container; means adjacent to the upper end of said body for supporting the latter within the container and for sealing the joint between said body and the container, and a normally open valve pivotally mounted on said tubular body adjacent to the lower end thereof with its center of gravity off-set relatively to its pivot so that it is controlled and operated by gravitational force to close against a seat on said tubular body and prevent the passage of the contents of the lower part of the container through said tubular body when the container is tilted sidewise in one direction and to be maintained by gravity in an open position to permit the passage of the contents of the lower part of the container through said tubular body when the container is tilted sidewise in the opposite direction.

4. An attachment of the character described constructed in accordance with claim 3 and wherein said body is made at its upper end with two oppositely disposed delivery-directing spouts extending radially therefrom at right angles to the pivotal axis of said valve.

5. An attachment of the character described comprising a tubular body for insertion within the upper portion of a container; an exteriorly conical annulus of resilient material surrounding and carried by the upper end of said body for supporting the latter within the container and for sealing the joint between said body and the container; a normally open valve pivotally mounted on said tubular body adjacent to the lower end thereof with its center of gravity off-set relatively to its pivot so as to be swung by gravity on an axis at right angles to the axis of said tubular body into a closed position against a seat on the latter when the container is tilted sidewise in one direction at right angles to said first-mentioned axis thereby to deliver the contents of said tubular body to the exclusion of the contents of the lower portion of the container, and a radially disposed spout forming part of the top of said tubular body, said spout being orientated with respect to said first-mentioned axis so as to receive and direct the discharge from said tubular body when the container is tilted in said direction.

ARTHUR G. B. METCALF.